Jan. 19, 1954 R. N. KIMURA 2,666,288
BAMBOO RAKE HANDLE ATTACHING STRUCTURE
Filed March 25, 1950
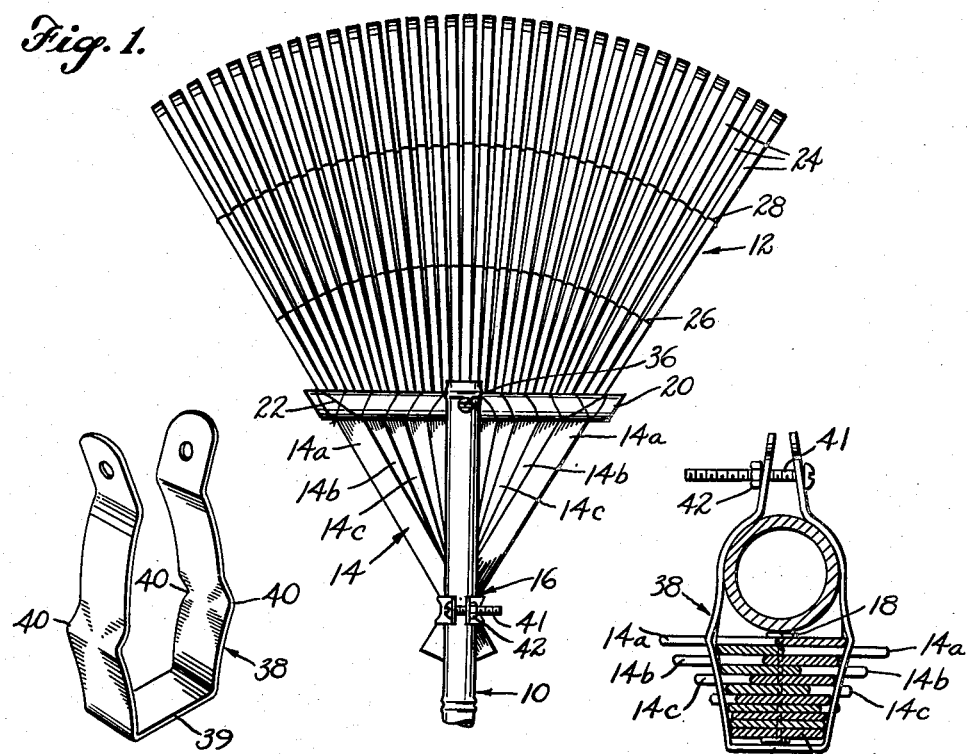
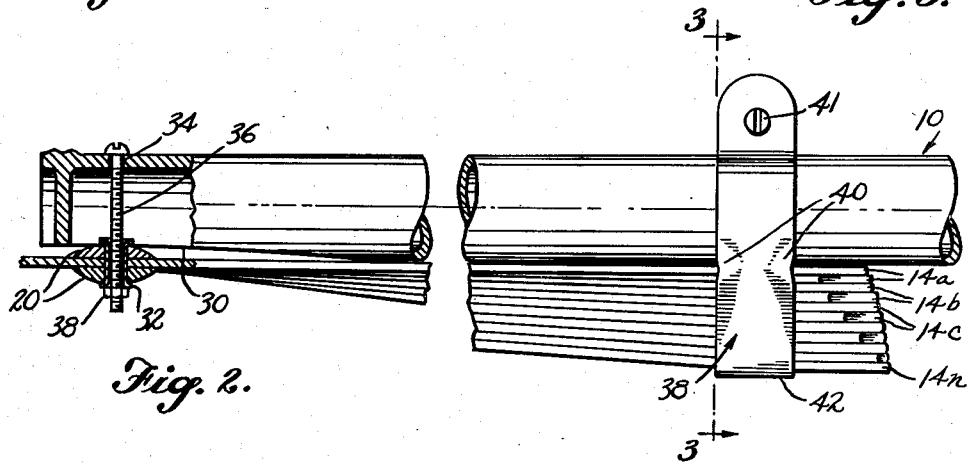
INVENTOR.
RICHARD N. KIMURA
BY
Reynolds, Beach & Christensen
ATTORNEYS Patented Jan. 19, 1954

2,666,288

UNITED STATES PATENT OFFICE 2,666,288

BAMBOO RAKE HANDLE ATTACHING STRUCTURE

Richard Noriaki Kimura, Seattle, Wash.

Application March 25, 1950, Serial No. 151,907

4 Claims. (Cl. 56—400.17)

1

This invention relates to improvements in bamboo rakes and is primarily concerned with the provision of an improved handle attachment for such rakes.

The market for the familiar fan-shaped bamboo leaf rake depends greatly upon its low cost and its comparatively durable lightweight construction. A principal factor in the expense of previously known rakes, however, has been either excessive shipping costs resulting from the necessity of shipping the rakes from Japan to the United States with the rake head and the bamboo pole handle in assembled condition, or the expense of assembling these parts after their arrival in the United States. An object of this invention is to provide a rigid and secure handle attachment device for such a rake which can be applied quickly and securely and will thus reduce materially the cost of the rake in condition for the market.

A related object is to provide such a handle attachment which does not weaken the bamboo assembly constituting the rake head, but actually strengthens the rake head by securing the parts more firmly together.

My invention, being directed to the foregoing and other objects, has as its principal feature a special screw-tightened clamp band by which the stacked convergent ends of the flat bamboo strips arranged to form the fan-shaped rake head are bound securely as a group to the bamboo rod handle at a location spaced a short distance from one end of the handle. Such end of the handle is also secured to the rake head by a screw which passes through a handle aperture and a metal eyelet aligned therewith, such eyelet extending through and interconnecting rake head crosspieces secured flatly against opposite sides of the rake head strips.

One of the important features of the U-shaped clamp band is the special form of its sides, which are troughed at opposite edges to conform the band closely to the transverse contour of the neck portion of the rake head at which the bamboo strips lie crossed over one another in stacked relationship. As a result, when the band is applied to the rake head it will fit accurately and hence can be located readily, and provides maximum area of contact between the band and the bamboo strip stack edges. Because of the snug and accurate fit of the clamp on the rake head there is minimum possibility of the handle working loose and little tendency for the bamboo parts to chafe and wear.

These and other features, objects and advantages, of the invention, including the details of a preferred bamboo rake construction embodying the same, will now be described in detail by reference to the accompanying drawings.

Figure 1 is a top view of the rake head and end portion of the bamboo rod handle attached thereto.

Figure 2 is an enlarged side view of the same with parts broken away to show a detail of the handle attachment, the view being confined substantially to a showing of the portions of the rake head and handle which mutually overlap.

Figure 3 is a transverse sectional view taken on line 3—3 in Figure 2.

Figure 4 is an enlarged isometric view of the novel handle-attaching clamp.

In the illustrated case the bamboo pole 10, constituting the rake handle and the bamboo strip assemblage 12, constituting the rake head, are of a general construction which is quite familiar and widely used. The rake head is fan-shaped, being formed by a number of flat bamboo strips 14 of uniform length and usually of uniform width. These strips have tip ends split into several fingers 24 and spread in a circular sector pattern, and base ends which, as seen in Figure 1, mutually converge to a neck or apex 16. Such base ends mutually overlap, oppositely located strips crossing over one another with their butt tips projecting beyond the general point of cross-over, and are held together in this stacked relationship by means to be described.

For purposes of mechanical symmetry and balance the strips 14 are usually stacked in sequence such that the base ends of corresponding strips at opposite sides of the center of the rake head lie in contact with each other. The two opposite side strips 14a are placed immediately adjacent to each other at the top of the stack, followed next by the two strips 14b adjacent to the side strips 14a, similarly paired, then by the two next inner strips 14c similarly placed, etc., and finally by the center strip 14n, as shown in Figures 1 and 3.

Thus the angle between the base ends of adjacent strips is progressively greater from a substantially parallel relationship at one side of the stack to maximum divergence at the other side. A suitable fastener for the base ends of the strips comprises the tie wire 18 (Figure 3) which passes through aligned apertures in the strips at their center of overlap, and has each end bent over to hold the strips together. As mentioned, the butt ends of the strips project free a short distance beyond their center of overlap or intersection, as viewed in Figure 1, at which wire 18 is located.

A pair of clamp bars 20, also of bamboo, are lashed by a wire 22 crosswise of the strips 14 at a substantial distance from the apex end of the head. These crosspieces clamp the strips 14 between them and thereby hold in a common plane the portions of the strips thus engaged, the amount of bend required of each strip between the neck 16 and the crosspieces to achieve such coplanar relationship depending upon the respective locations of the strips in the stack. The tips of the rake fingers 24 are turned substantially at right angles to form rake teeth according to the usual construction. These teeth are maintained uniformly spaced by spreader wires 26 and 28 which are wound sinuously over and under succeeding fingers 24 from one edge of the rake head to its opposite edge and then back again in the reverse fashion to form a series of loops holding each tooth spaced from its neighbor. Thus far described the rake is generally conventional form. Moreover certain variations in its form could be made without altering the applicability of the invention to the rake.

According to the invention the handle 10 is attached to the rake head 12 at two points at least by the novel means now to be described. Preferably the end of the handle overlapping the rake head is beveled or notched to provide a flat section 30 for anti-rolling engagement with the adjacent side crosspiece 20. A metal eyelet 32 interconnects the two crosspieces 20 at a central location, its ends preferably being flanged outward for retaining purposes. In registry with this eyelet the handle has a bore 34 which receives a fastening bolt 36 extending also through the eyelet. When the nut 38 is tightened on the screw the end of the handle is thus held securely to the rake head. The metal eyelet 32 aligns the bores through crosspieces 20 and a strip 14 to facilitate insertion of bolt 36, and lines such bores to prevent chafing and wear thereof by the bolt.

At the second point of fastening of the handle to the rake head, which is at the apex or neck 16, a special U-shaped clamp 38 (Figure 4) is placed around the stacked base ends of the bamboo strips 14, the sides of such clamp projecting well beyond such stack of strip base ends to embrace the handle which lies flat against the stack. The clamp is tightened, as shown in Figure 3, by a screw 41 and coacting nut 42, the screw passing through the apertured ends of the clamp to draw them toward each other over the handle.

The clamp 38 is preferably formed of a strip of resilient metal, such as steel of relatively thin gauge, 24 or 28 gauge, for example, and capable of being bent sufficiently to conform to the contour of the handle cross section as the ends of the band are drawn together by tightening the screw and nut. The important feature of this clamp, however, resides in the special formation of its sides to fit accurately the peculiarly shaped contour of the assembly of bamboo strips 14 at the neck 16 of the rake head for ready application and maximum gripping effectiveness, while being easy to shape.

At locations corresponding to the positions of the edge strip bases in the rake head stack, the edges of each side of the U-shaped clamp are locally bent outward as shown in Figure 4 to form a dihedral angle. Each edge of each clamp side is thus formed with a generally V-shaped bend, and from each such bend a V-shaped valley or trough tapers both in width and depth toward the central portion of the clamp side. By this structure the sides of the clamp are relieved to avoid sharp edge contact with the bases of the rake head edge strips, but on the contrary such troughs 40 will fit snugly in the angle formed by the bases of the rake head edge strips in the stack, which angle corresponds to the dihedral angle between the bent portions of the clamp sides constituting the bottoms of troughs 40. These bamboo strips thus will be embraced firmly and substantially contiguously over an appreciable portion of their length to hold them firmly, yet sharp edge contact of the clamp with the strips will be avoided.

Moreover, the resilience of the clamp, which tends to move its free edges toward each other, will spring the bent portions of the clamp sides toward each other so that when such bent portions embrace the edges of the rake head edge strip bases, the clamp will be held in place when it is slipped on, enabling the bolt 41 to be inserted readily through the apertures in the ends of the clamp sides at the side of handle 10 opposite the stacked strips. Otherwise the clamp would tend to slide off the stacked bamboo strips when spread to embrace it, because the crossband 39 of the clamp is of a length substantially equal to the width of the centrally located strip, which it and the adjacent side portions consequently embrace snugly.

It will be evident, therefore, that the distance between the troughs 40 and the crossband 39 of the U-shaped clamp will correspond to the thickness of the stack of bamboo strips at the neck of the rake head. This dimension will be selected in accordance with the number and thickness of the bamboo strips incorporated in the rake head. Also, of course, the distance between the troughs 40 and the tips of the clamp sides will depend upon the cross sectional size of handle to be secured to the rake head. Because of the considerable difference in divergence between the bases of the edge strips in the stack and the bases of even the next inward strips in the rake head, both sides of the troughs can be steeply inclined relative to the planes of the respective clamp sides without the necessity of each trough engaging more than a single strip edge, namely that of an edge strip 14a of the rake. Consequently one side of the stack of strips will be engaged snugly by the crossband 39 and adjacent portions of the sides of the clamp, while the other side of the stack of strips will be engaged snugly by troughs 40. Moreover, the portions of the clamp sides alongside the rake neck 16 will lie close to or touching the neck to assist in preserving the proper conformation of the stack and to prevent longitudinal sliding of the clamp along the handle in either direction.

When the screw 41 has been inserted through the apertures in the ends of the clamp sides and the nut is tightened in the screw, thus drawing together the ends of the clamp over the handle, the increasing upward convergence of the clamp sides tends to wedge the handle downward and press it with increasng firmness against the upper side of the rake head neck 16. Simultaneously the bottom or the crossband 39 of the clamp is being drawn upward and clamps the stack of strips more tightly together, thereby strengthening the rake head assembly as well as securing the handle rigidly to it. Chafing and wear of the strip edges, or cutting of such edges by the edges of the clamp sides is negligible because of the relatively large area of contact and close gripping of the strips by the troughs 40 of the specially formed clamp.

I claim as my invention:

1. In a bamboo rake, a rake head incorporating a plurality of bamboo strips arranged generally in the shape of a fan with the butt ends of the strips being disposed in a stack, the butt ends of the side strips of the head being at one extremity of said stack, crossed in said stack and diverging oppositely, and the butt ends of the central strips of the head being at the other extremity of said stack, a handle pole engaged with the side strip extremity of said stack of strip butt ends, and a generally U-shaped sheet metal band clamp encircling said stack of strip butt ends and the handle and having a crossband engaging the central strip extremity of said stack remote from said handle pole, band sides joined to said crossband and extending alongside said stack of strip butt ends, and free end portions of said band sides embracing said handle pole, each of said band sides having, generally centrally between its free end and said crossband, troughs in its opposite edge portions projecting outwardly from the portion of such band side between such edge portions and away from the other band side, and said troughs being tapered in width and depth toward each other and receiving the edges of the side strips of the rake head at their point of crossing, and means interconnecting the free end portions of said clamp's band sides at the side of said handle pole remote from said stack of strip butt ends and holding said clamp's free end portions in position pressing said handle pole tightly against said stack of strip butt ends.

2. A generally U-shaped sheet metal clamp adapted for securing together a handle pole and a stack of crossed strips diverging oppositely in a fan-shaped rake head, comprising band sides of substantial width disposed in face-to-face relationship, a portion joining the corresponding ends of said band sides opposite their free ends, each of said band sides having, at corresponding locations spaced a substantial distance from said joining portion, troughs in its opposite edge portions projecting outwardly from the portion of such band side between such edge portions and away from the other band side, and said troughs in each band side being tapered in width and depth toward each other, and tensioning means interconnecting the free ends of said clamp's band sides and operable to constrict the clamp for tightening it.

3. In a bamboo rake, a rake head incorporating a plurality of bamboo strips arranged generally in the shape of a fan with the butt ends of the strips being disposed in a stack, the butt ends of the side strips of the head being at one extremity of the stack, crossed in said stack and diverging oppositely, and the butt ends of the central strips of the head being at the other extremity of said stack, clamping bars extending crosswise of said strips and engaging opposite sides thereof, eyelet means extending through said rake head and said clamping bars and maintaining said clamping bars in registry at the location of said eyelet means, a handle pole engaged with one of said clamping bars and with the side strip extremity of said stack of strip butt ends, a bolt extending through said eyelet and said handle pole, and a generally U-shaped sheet metal band clamp encircling the stack of strip butt ends and said handle and having a strip crossband engaging the central strip extremity of said stack remote from said handle pole, band sides joined to said crossband and extending alongside said stack of strip butt ends, and free end portions of said band sides embracing said handle pole, each of said band sides having, generally centrally between its free end and said crossband, troughs in its opposite edge portions projecting outwardly from the portion of such band side between such edge portions and away from the other band side, and said troughs being tapered in width and depth toward each other and receiving the edges of the side strips of the rake head at their point of crossing, and means interconnecting the free end portions of said clamp's band sides at the side of said handle pole remote from said stack of strip butt ends and holding said clamp's free end portions in position pressing said handle pole tightly against said stack of strip butt ends.

4. In a bamboo rake, a rake head incorporating a plurality of bamboo strips arranged generally in the shape of a fan with the butt ends of the strips being crossed and disposed in a stack, clamping bars extending crosswise of said strips and engaging opposite sides thereof, eyelet means extending through said rake head and said clamping bars and maintaining said clamping bars in registry at the location of said eyelet means, a handle pole engaged with one of said clamping bars and with said stack of strip butt ends, a bolt extending through said eyelet and said handle pole, a generally U-shaped metal clamp encircling the stack of strip butt ends at their point of crossing and said handle, and means interconnecting the free end portions of said clamp and holding said handle pole tightly against said stack of strip butt ends.

RICHARD NORIAKI KIMURA.

References Cited in the file of this patent
UNITED STATES PATENTS

| Number | Name | Date |
|---|---|---|
| 1,499,086 | Tsuchiya | June 24, 1924 |
| 1,752,447 | Maus | Apr. 1, 1930 |
| 1,837,677 | Rocquin | Dec. 22, 1931 |